United States Patent [19]

Inoue et al.

[11] Patent Number: 5,034,689

[45] Date of Patent: Jul. 23, 1991

[54] DETECTOR FOR DETECTING FOREIGN MATTER IN AN OBJECT BY DETECTING ELECTROMAGNETIC PARAMETERS OF THE OBJECT

[75] Inventors: Shinichi Inoue, Kobe; Kazuo Nakayama, Akashi, both of Japan

[73] Assignee: Yamato Scale Company, Limited, Akashi, Japan

[21] Appl. No.: 336,213

[22] Filed: Apr. 11, 1989

[30] Foreign Application Priority Data

Apr. 13, 1988 [JP] Japan .................................. 63-92000

[51] Int. Cl.$^5$ ...................... G01N 27/72; G01R 33/12
[52] U.S. Cl. ................................... 324/225; 324/226; 324/233; 324/243
[58] Field of Search ................. 324/225, 233, 326–329, 324/234, 236, 239, 243; 364/481, 482, 507, 550, 581; 209/559, 562, 563, 564, 567, 570, 571

[56] References Cited

U.S. PATENT DOCUMENTS 4,325,027  4/1982  Dykstra et al. ...................... 324/329

FOREIGN PATENT DOCUMENTS

84620/82   6/1981  Australia .
B-46546/79 5/1983  Australia .
WO88/03273 5/1988  Int'l Pat. Institute .............. 324/239
57-198880  10/1982 Japan .
62-53071   11/1987 Japan .

Primary Examiner—Walter E. Snow
Attorney, Agent, or Firm—Senniger, Powers, Leavitt & Roedel

[57] ABSTRACT

A foreign matter detector includes an oscillator for generating an oscillating signal, a phase shifter connected to the oscillator and adapted to provide a phase shifted oscillating signal, and an electromagnetic transducer. The transducer includes an excitation coil connected to the oscillator and two interconnected detection coils magnetically coupled to the excitation coil and adapted to produce a differential signal therebetween when an object is passed through the transducer. The detector also includes a first detector adapted to produce a first detected analog signal corresponding to the component of the differential signal in phase with the oscillating signal and a second detector adapted to produce a second detected analog signal corresponding to the component of the differential signal in phase with the phase shifted oscillating signal. The detector further includes an analog to digital converter connected to the first and second detectors adapted for converting the first and second analog detected signals into first and second series of digital values, respectively, circuitry connected to the converter for weighting the digital values, and circuitry connected to the weighting circuitry for selecting a representative value for the object from each of the first and second series of the weighted digital values.

22 Claims, 10 Drawing Sheets

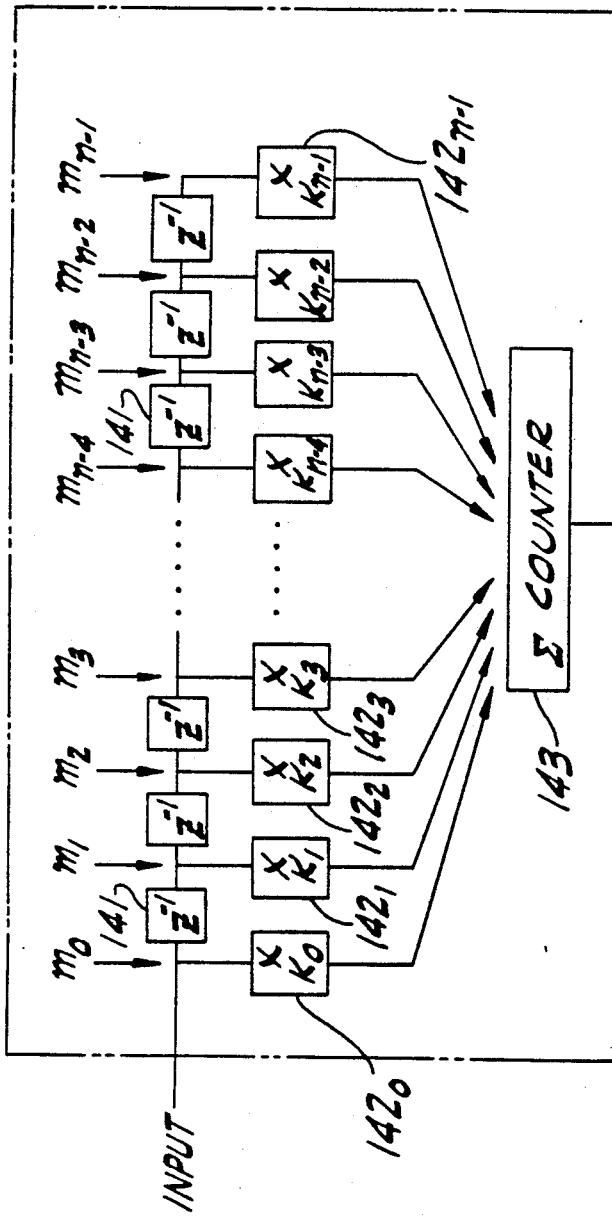

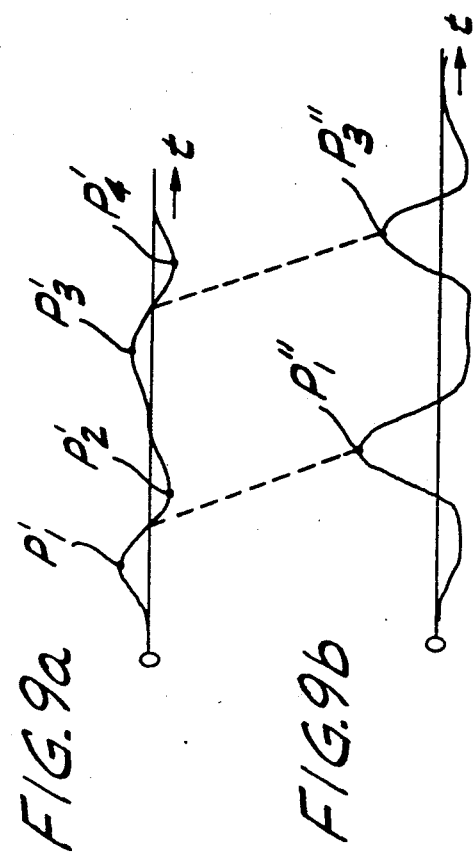
FIG.9a
FIG.9b
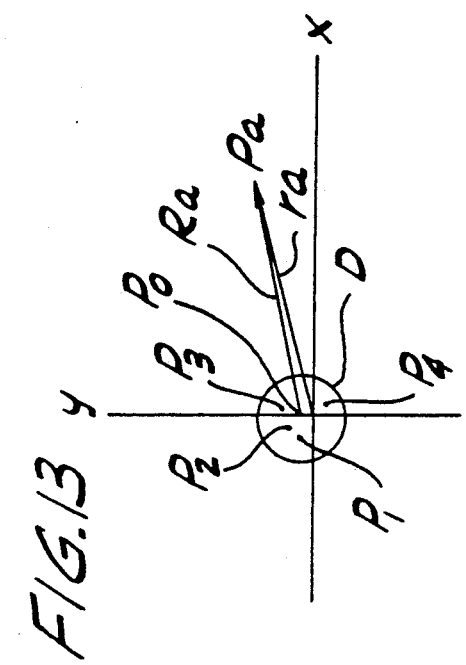
FIG.13
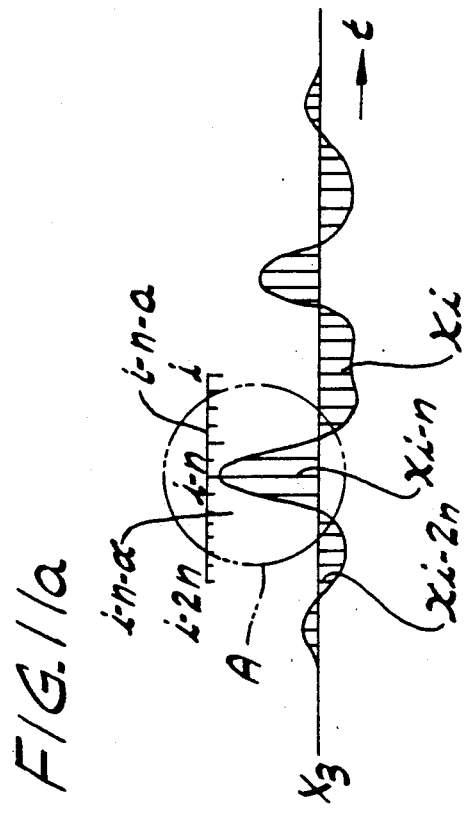
FIG.8
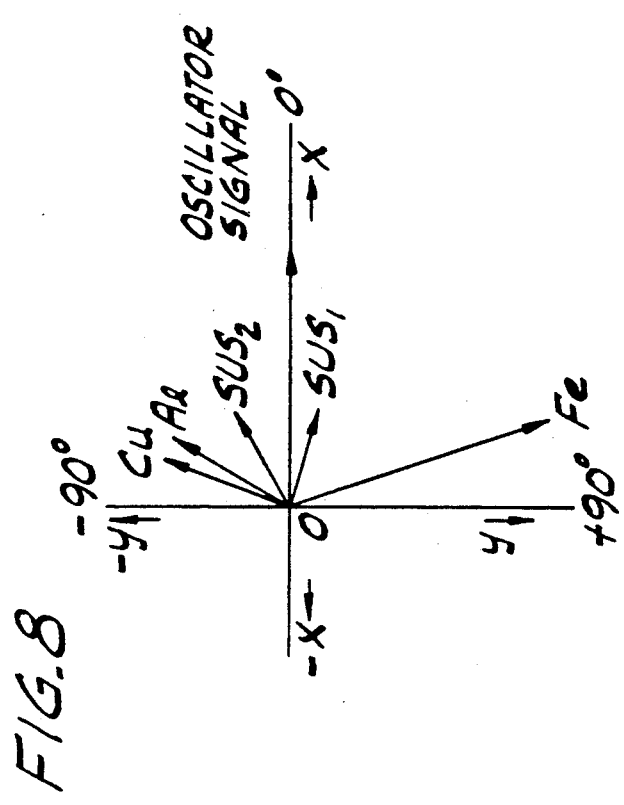
FIG.11a

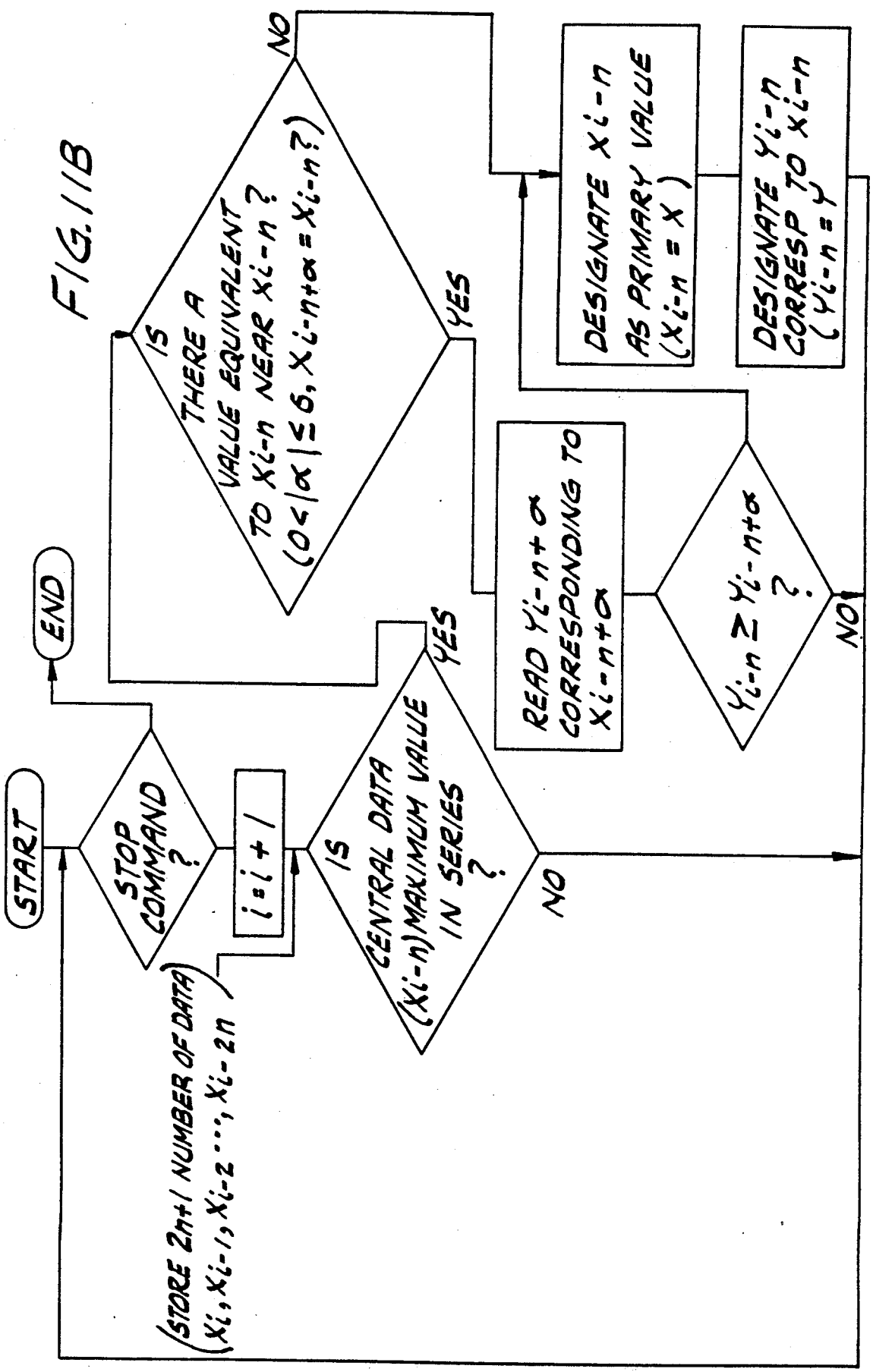

DETECTOR FOR DETECTING FOREIGN MATTER IN AN OBJECT BY DETECTING ELECTROMAGNETIC PARAMETERS OF THE OBJECT

BACKGROUND OF THE INVENTION

This invention relates to a detector for detecting intermediate products in raw materials or in wrapped finished products of food products or for detecting the presence of materials such as metals and other foreign matter in pharmaceutical products. This invention also relates to a detector for detecting in products a different quality from the inherent or standard quality of the actual product.

For manufacturers, such as food product manufacturers and pharmaceutical manufacturers, the presence of foreign matter in raw materials could cause damage to processing equipment. Also, the presence of foreign matter in finished products poses problems with regard to health and safety of the products. For this reason, detectors have long been used for inspections at the point at which raw materials for food products or pharmaceutical products are supplied to processing equipment and for inspection at the shipping point of wrapped finished products in order to determine whether or not foreign matter was present in the products.

As shown in FIGS. 15 and 16, this type of prior art detector is provided with a primary coil 3 which generates an alternating magnetic field when a high-frequency electrical current is supplied. Two secondary coils 4 and 5 are positioned inside this electromagnetic field. These coils 4 and 5 are wound in opposite directions from each other and are interconnected in series. The detector utilizes the following phenomena which occur when the object being inspected is passed through the primary coil 3 and the two secondary coils 4 and 5 as indicated by arrow 31. If iron is contained in the object being inspected, the magnetic flux density will increase. The induced voltage of the secondary coil 4, which is closer to the point which the object is passing, will become higher than the induced voltage of the other secondary coil 5. Also, if a nonferrous metal is contained in the object, the eddy current occurring inside the nonferrous metal will cause a loss of the lines of magnetic force. As a result, the induced voltage of the secondary coil 4 will become lower than the induced voltage of the secondary coil 5.

Some food products may contain water or salt which may generate a relatively large signal even though they do not contain foreign matter. This signal represents the product characteristics of the material. If ferrous or nonferrous foreign matter is contained in these materials, the combination of the signal from this foreign matter and the product characteristics described above result in a composite signal. However, because the signal resulting from the foreign matter will be small if the foreign matter is small, there is little difference between the signal generated by the product characteristics of the product itself and the combination of this signal and that caused by the foreign matter. This makes it difficult to detect the foreign matter.

It is in consideration of problems such as this that detectors such as that described in Japanese Patent Provisional Publication Sho. 57-198880 have been proposed. In that detector, the oscillation signal from an oscillator is amplified via a phase adjuster to excite the primary coil. The difference in the induction voltages generated at the two secondary coils when the product passes through is used as the detection signal. This signal is first amplified and then split into two output signals. One of these output signals is detected using a chopper which is synchronized with the aforementioned oscillation signal to obtain an in-phase output signal. In addition, the other of these output signals is detected by a chopper which is provided with a phase difference of 90° with respect to the aforementioned oscillation signal to obtain a quadrature output signal. In this method, each of the obtained output signals passes through its own filter and is independently compared by a level comparator. However, with this type of detector, the detected and rectified signal (such as that shown in FIGS. 2b and 2c) is shaped into a single (single-series) signal having either positive-negative peaks or negative-positive peaks for each batch of the product. Thus, because the detection signal is such that it has two peaks for each batch of the product, the first half of the signal and the second half of the signal must be identified as a single signal. However, if the products are fed in continuously at relatively short intervals, it is difficult to accurately identify the separate signals for each batch of material.

In this regard, the technology for processing signals which are input continuously has been described in Japanese Patent Publication Sho. 62-53071. In that method, a positive-polarity signal comparator and a negative-polarity signal comparator are provided for the detected and rectified input signals. For example, input signals which indicate a positive polarity which exceeds a positive reference value are first input to the positive-polarity signal comparator. Input signals which indicate a negative polarity which are more negative than a negative reference value are then input to the negative-polarity signal comparator. The signal output from a monostable vibrator operated by the signal output from the positive-polarity signal comparator through a timer and the signal output by the negative-polarity signal comparator are then both processed by an AND circuit. Foreign matter is detected by this type of signal output as a result of this processing. In this method, because the identified signal indicates only information that foreign matter has been detected, there is no quantitative information provided such as information indicating the type or amount of foreign matter.

SUMMARY OF THE INVENTION

It is an object of this invention to provide a detector for detecting the presence of metals and other foreign matter which provides a detection signal which can be separately and clearly identified even when the signals are input continuously at relatively short intervals, and moreover, which provides detection signals containing quantitative information.

It is another object of this invention to provide a foreign matter detector which overcomes previously difficult problem of identifying each individual detected signal when the signals appear intermittently as double wave detected signals by providing each signal as an easily identifiable waveform.

It is also an object of this invention to provide a foreign matter detector employing detection signals which can be converted from a double wave signal having two polarities to a signal having a single maximum value. It is another object of this invention to provide a foreign matter detector employing a detection signal which retains quantitative information needed in detecting and/or identifying foreign matter after signal processing and conversion.

A detector for detecting foreign matter in an object according to this invention comprises means for providing a detected signal representative of an electromagnetic parameter of the object, means connected to said providing means for converting said detected signal into a series of digital values, means connected to said converting means for weighting said digital values, and means connected to said weighting means for determining a representative value for the object from said weighted digital values and for comparing said representative value to reference values.

Other objects and features will be in part apparent and in part pointed out hereinafter.

BRIEF DESCRIPTION OF THE DRAWINGS

FIG. 6 is a block diagram of one form of weighting circuit for the detector;

FIG. 7 shows the processing steps of the weighting performed in the circuit of FIG. 6;

FIG. 8 is a two-axis coordinate system showing vectors which represent the detected values and types of metal;

FIG. 9a shows a signal output from one of the smoothers/filters in the detector when two objects are passed in succession through the transducer;

FIG. 9b shows a weighted signal obtained by weighting the signal of FIG. 9a;

FIG. 11a shows monitoring of weighted digital values to obtain a primary value;

FIG. 11b is a flowchart of a program for determining a primary (maximum) value;

FIG. 13 shows a graph representing sample test data for objects having no material effect;

Corresponding reference characters indicate corresponding parts throughout the several views of the drawings.

DETAILED DESCRIPTION OF PREFERRED EMBODIMENTS

Figure 1:
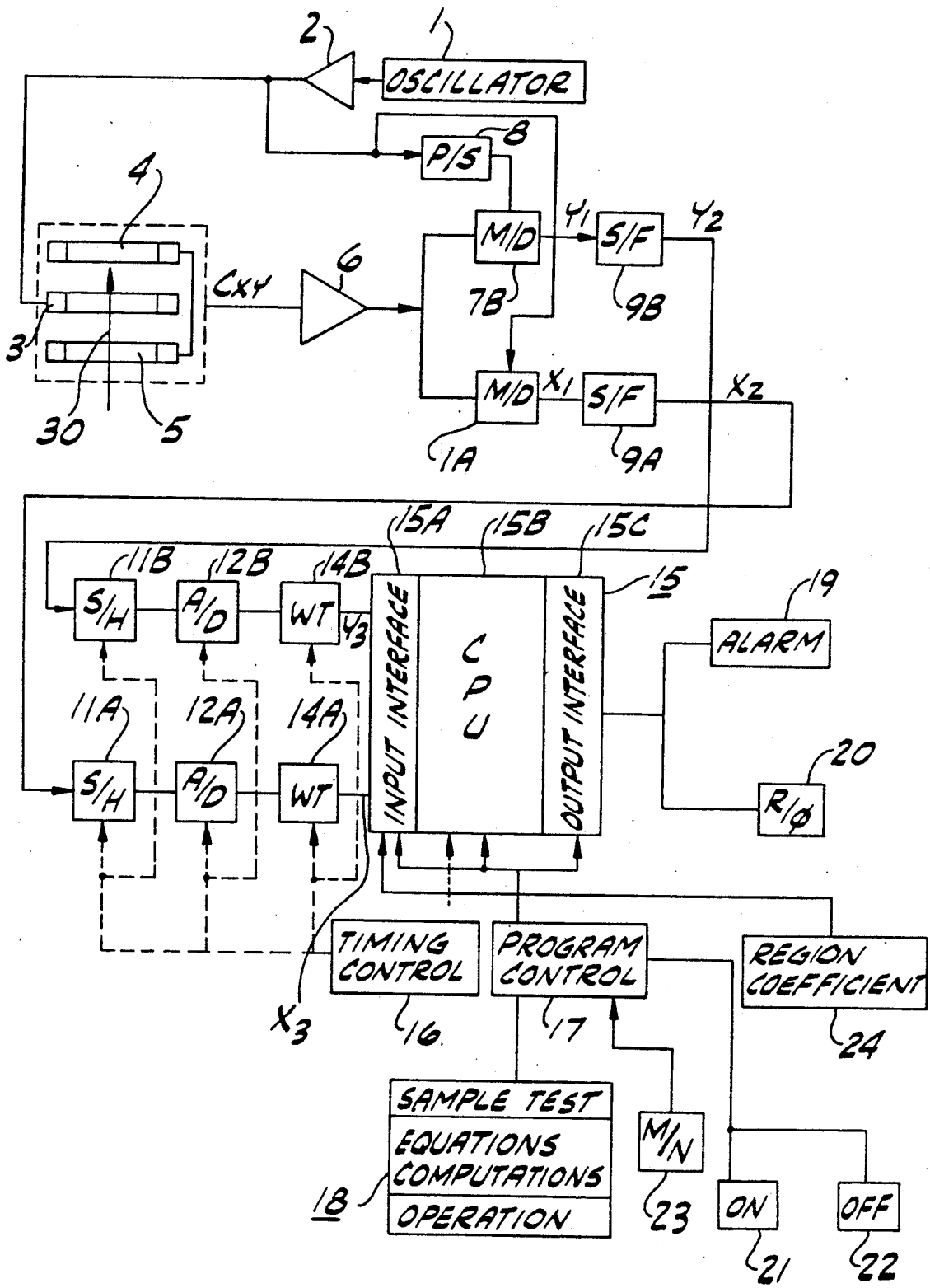
FIG. 1 is a block diagram of a detector according to the invention.
Figure 15:
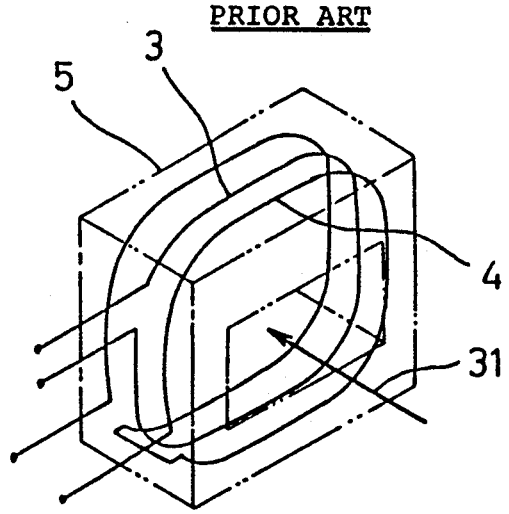
FIGS. 15 and 16 schematically show conventional, prior art electromagnetic transducers.
Figure 16:
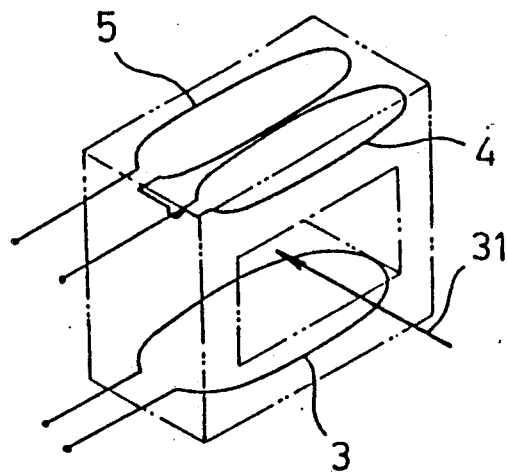

In FIG. 1, an oscillator 1 generates a sine-wave electrical alternating current signal having a frequency which is selectable within a range of 30 to 400 kHz (high-frequency current). An amplifier 2 amplifies the sine-wave signal from the oscillator 1 and then supplies it to the primary or excitation coil 3 of a transducer, which is essentially the same as a differential transformer. The coil 3 generates an alternating electromagnetic field. The two secondary or detection coils 4 and 5 of the transducer are arranged in close proximity to this primary coil 3, one on each side, within and coupled to the alternating electromagnetic field so that they are coaxial with the primary coil 3 as shown in FIG. 15. The coils 3 through 5 may also be arranged in parallel planes as shown in FIG. 16. Coils 4 and 5 constitute means for providing a detected signal representative of an electromagnetic parameter of the object being evaluated. By connecting these secondary coils 4 and 5 so that they operate differentially (so that the induced voltages or induced currents cancel each other out), a detection means for detecting the difference in the induced signals which occur at these two secondary coils is formed.

The output line from the secondary coils 4 and 5 is connected to an amplifier 6. The output side of this amplifier 6 is subsequently divided and connected to the input side of multiplier/detectors 7A and 7B. These multiplier/detectors 7A and 7B are essentially the same as the four-quadrant detectors or product detectors which are used in FM receivers.

One of the signals which is divided after the amplifier 2 is input in the same phase to the multiplier/detector 7A for use as a reference signal. The divided signal is further divided and phase-delayed 90° by a phase shifter 8 for input to the other multiplication detector 7B as a reference signal.

The respective output sides of the multiplier/detectors 7A and 7B are connected via smoother and filter 9A or smoother and filter 9B to the input sides of sample-and-hold circuits 11A and 11B, which temporarily store the signals in memory. The output sides of these sample-and-hold circuits 11A and 11B are connected to A/D converters 12A and 12B, respectively, which convert the analog signals into digital signals. The output sides of these A/D converters 12A and 12B are connected via weighting circuits 14A and 14B, respectively, to a control device (computing device) 15, which constitutes means for recognizing a primary value of the digital signals and for identifying foreign matter and material effect of the object. Control device 15 is equipped with an input interface 15A for inputting the aforementioned signals, a central processing unit (CPU) 15B, such as a microprocessor, which processes the input signals, and an output interface 15C for outputting the results of the processing.

Control device 15 is connected to a timing control circuit 16 and a program control circuit 17. In order to control the timing, timing control circuit 16 is connected to the A/D converters 12A and 12B, the sample-and-hold circuits 11A and 11B, and the weighting circuits 14A and 14B. The program control circuit 17 is connected to a selector switch 18 for selecting the mode of operation from three settings: "sample test", "equations computation", and "operation".

The output interface 15C of the control device 15 is connected to an alarm 19 such as a lamp or buzzer which emits a warning indication when foreign matter is detected and to an R/φ indicator 20 which indicates the magnitude of the data and the phase angle. The data and phase angle represent the magnetic characteristics (parameters) or the type of material effect of the object, i.e., the type of foreign matter (metal, iron or non-ferrous metal, etc.) which has been detected in the object. Furthermore, the program control circuit 17 is connected to an execution button 21 which initiates operation of the control device 15, and to a stop button 22 which terminates operation of the control device 15.

The program control circuit 17 is also connected to a sample mode selector switch 23 for switching the sample mode between "M" and "N" modes. A region coefficient setting device 24 for specifying the region of the coefficients of the discriminant equation is connected to the input interface 15A of the control device 15.

Although the details will be explained later, the weighting circuits 14A and 14B are each shown in FIG. 6. In this embodiment weighting circuits 14A and 14B comprise n-1 stages of delay components 141, which are selected as appropriate in accordance with the sample time interval T and connected in cascade from the input sides to the output sides. The line to the input to each delay component 141 is divided. One branch of the division is connected to the next delay component. The other branch of the division and the output side of the last delay component is connected to the corresponding coefficient multipliers $142_0$ to $142_{n-1}$. Each of the output sides of the various coefficient multipliers $142_0$ to $142_{n-1}$ is connected to a summer such as counter 143. By using digital computing, it is also possible for the weighting circuit to be comprised of a microcomputer having functions equivalent to the weighting circuit embodiment illustrated in FIG. 6.

As will be explained later, the method used by the weighting circuits 14A and 14B to assign the coefficients to the coefficient multipliers $142_0$ to $142_{n-1}$ is an odd-function distribution. An odd function distribution is a function which is symmetrical with respect to the origin. For example, $Y = \sin \theta$ where $-\pi < \theta < \pi$ is an odd function. The origin is the intersection of the X and Y planes of an X-Y coordinate system. In other words, each weighting circuit has a coefficient distribution in which the coefficients are assigned to the coefficient multipliers in such a manner that the origination point of the odd function is located at or near the center coefficient multiplier of the coefficient multipliers $142_0$ to $142_{n-1}$ arranged in order, or with a similar coefficient distribution.

In one preferred embodiment, the weighting coefficients have a distribution corresponding to the changes in time of the detected signal when a typical material such as iron passes through the primary and secondary coils. For example, the distribution of coefficients may be a waveform formed of an upward triangle and a downward triangle similar to that shown in FIG. 4a, or a one cycle sine-wave like that shown in FIG. 4b, or a waveform with a distribution comprised of two squares like that shown in FIG. 4c, or a distribution configuration similar to these waveforms. The weighting coefficients for each waveform are assigned in advance to the two weighting circuits 14A and 14B.

SIGNAL DETECTION AND PROCESSING (WEIGHTING PROCESSING)

The following is an explanation of the contents of the program stored in the memory of the control device 15. An explanation of the execution of the program and of the operations of the various components mentioned above as the program is executed is also described.

Figure 2A:
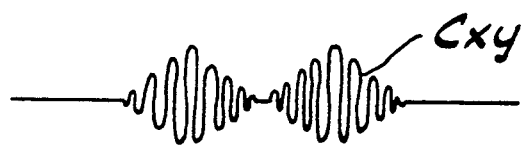
FIGS. 2a-2c show analog signals at various stages in the detector.

When an object containing iron is passed through (or adjacent) the primary coil 3 and the secondary coils 4 and 5 for inspection the electromagnetic induction formed between the primary coil 3 and the secondary coils 4 and 5 changes as the object being inspected passes. An induced voltage (detection signal $C_{xy}$) with a shape such as that shown in FIG. 2a is generated as the differential output of the secondary coils 4 and 5.

This detection signal $C_{xy}$ is amplified by the amplifier 6, and then input to the multiplier/detectors 7A and 7B. The detection signal which is input to the multiplier/detector 7A is detected by multiplication by a reference signal having a phase which is the same the phase of the signal produced by oscillator 1. That signal detected by detector 7A (referred to as in-phase detected signal $X_1$) has a waveform such as that shown in FIG. 2b. Meanwhile, the detection signal $C_{xy}$ input to the multiplier/detector 7B is detected by multiplication by a reference signal having a phase which is shifted 90° from the phase of the signal produced by oscillator 1. The signal detected by detector 7B (referred to as phase shifted detected signal $Y_1$) has a waveform such as that shown in FIG. 2b.

Figure 2C:
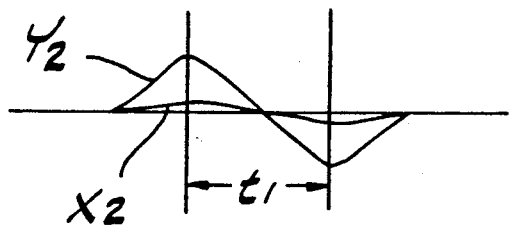

The detected signals $X_1$ and $Y_1$ are processed by corresponding smoothers/filters 9A and 9B so that they become filtered signals $X_2$ and $Y_2$ with waveforms such as those shown in FIG. 2c. Filtered signal $X_2$ corresponds to the signal component of the differential signal which is in-phase with the signal of oscillator 1, and filtered signal $Y_2$ corresponds to the signal component of the differential signal which has a 90° phase delay from the signal of the oscillator 1.

The filtered signals are temporarily stored in memory by the corresponding sample-and-hold circuits 11A and 11B. Each of the stored signals (which are analog signals) is converted to a digital signal by the corresponding A/D converters 12A and 12B.

The sample-and-hold circuits 11A and 11B and the A/D converters 12A and 12B are all operated in synchronization by the timing control circuit 16. The analog signals are converted into digital signals at regular intervals and then input to the corresponding weighting circuits 14A and 14B. At the weighting circuits 14A and 14B, as mentioned earlier and as will be explained in detail below, weighting computation (processing) characterized by a time distribution is performed and the processed output signals $X_3$ and $Y_3$ are provided to the input interface 15A of the control device 15.

Figure 3:
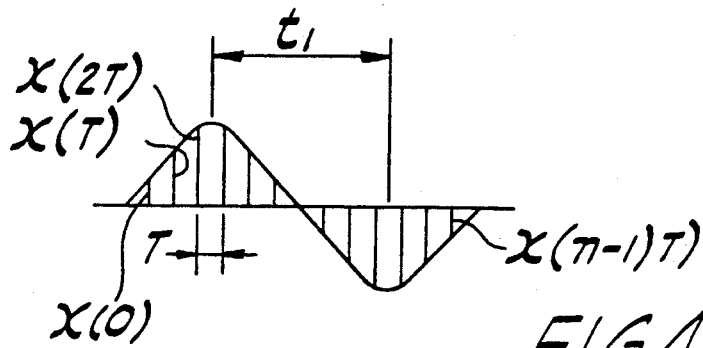
FIG. 3 shows a digital signal from one of the A/D converters in the detector.

Referring to the example illustrated in FIG. 3, when the processed output signal $X_2$ is input to the weighting circuit 14A, it is a discrete series of signals $X(O)$, $X(T)$, $X(2T)$, ... $X((n-1)T)$ at sample time intervals T. (For convenience, this explanation uses zero as the time of the first signal.)

Each of weighting circuits 14A and 14B has a transfer function which is a series which can be expressed as a polynomial relating to $Z^{-1}$ to the order $n-1$, as shown in the following Equation (1).

$$H_{(z)} = K_0 + K_1 Z^{-1} + K_2 Z^{-2} + \ldots K_{n-1} Z^{-(n-1)} \quad (1)$$

Figure 4A:
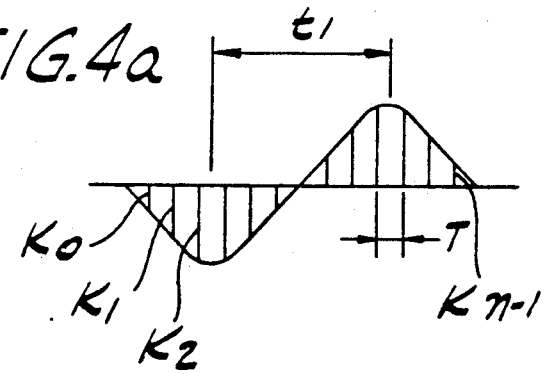
FIGS. 4a-4c are graphic representations of various weighting functions.

One preferred embodiment of weighting circuits 14A and 14B is shown in FIG. 6. Coefficients $K_0$, $K_1$, $K_2$ ... $K_{n-1}$ correspond to a sampling of the waveform illustrated in FIG. 4a, which resembles the changes over time of the signal detected when a typical material such as iron is passed through the primary and secondary coils. A typical waveform for iron is shown in FIG. 3. The sampling interval for the coefficients $K_0$, $K_1$, $K_2$, etc., which are shown in FIG. 4a is the same as the sample time interval T (see FIG. 3). When an input signal with a waveform such as that shown in FIG. 3 is input to a circuit having the transfer function of Equation (1) with its coefficients determined in this way, or to a circuit for which the coefficients are determined so as to make the circuit equivalent to the circuit with the composition shown in FIG. 6, a time series of data (output signals) such as that shown in FIG. 5 is obtained.

Figure 4B:
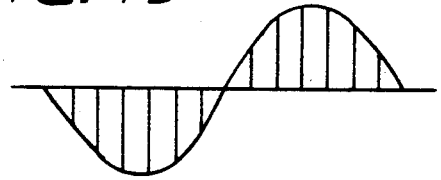
Figure 4C:
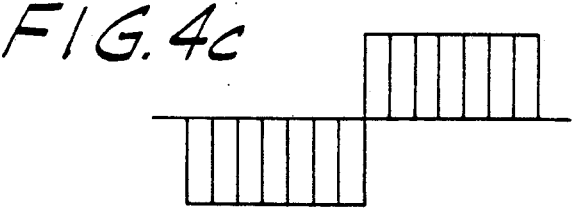

For the weighting coefficients described above, it is possible to use a configuration having a distribution comprised of an upward triangle and a downward triangle similar to that shown in FIG. 4a, or a one cycle sine waveform like that shown in FIG. 4b, or a configuration having a distribution comprised of two squares like that shown in FIG. 4C, or a configuration similar to any of these waveforms. In other words, any configuration is acceptable as long as the distribution of the weighting coefficients has a limited width with respect to time. This width corresponds to the order (the order n−1 mentioned above) of the transfer function described above and it has a odd-function distribution wherein the part located at the center of that order is the origin point.

Figure 5:
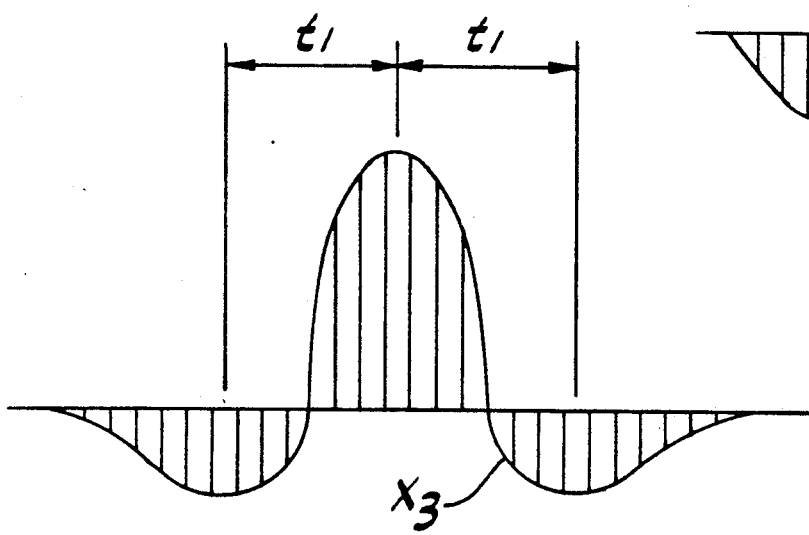
FIG. 5 shows a weighted digital signal from one of the weighting circuits in the detector.

As explained above, with the weighting coefficient configuration just described and an input signal such as that shown in FIG. 3, it is possible to obtain an output $X_3$ having substantially the same distribution configuration as that shown in FIG. 5. The $Y_3$ signal can also be obtained for the Y signal by processing in the same way as described above for the X signal.

No matter which of the above configurations of weighting processing (FIGS. 4a-4c) is used, an input signal with the polarities shown in FIG. 3 will produce the output signal shown in FIG. 5 having configurational characteristics which make a series of changes over time which resemble: 0→negative output →minimum value →increase →0→increase →maximum value →decrease→0→decrease →minimum value →increase →0.

The output signal shown in FIG. 5 has the following characteristics: (1) the amplitude of the maximum value is about twice that of the minimum value; (2) the polarity of the minimum value is the opposite of that of the maximum value; this minimum value appears twice at approximately au interval $t_1$ preceding and following the maximum value; and (3) the data of the output signal which precedes and follows the central maximum value is symmetrical or approximately symmetrical around that maximum value.

Conversely, if the polarities of the input signal are the reverse of those shown in FIG. 3, an output signal $X_3$ or $Y_3$ having the exact opposite polarities from those described above is obtained.

In other words, the output signal from the weighting means, to which an input signal such as shown in FIG. 3 is applied, has the characteristics of a discrete time-series output signal, which is distributed to be an even function with the origin point having the maximum value, if the time at which the time-series weighted signal has the maximum value is defined as the origin point of time.

The duration of the pulse transfer function for weighting is most preferably substantially the same as the period for which a typical material, such as iron, passes through the coils.

The maximum values of the signals $X_3$ and $Y_3$ are read by the identification section and used as the primary values $X_m$ and $Y_m$, which are representative values of the signals (signal values). The circuit shown in FIG. 6, which is an actual circuit for realizing the weighting circuit described above, is a non-recursive type circuit. It is commonly known as an FIR filter (finite impulse response filter) and one of the characteristics of this invention is the method it uses to assign the coefficients.

A detailed explanation of the functions of the circuit shown in FIG. 6 is as follows. This circuit has the composition described above. The signals input from the input side of the circuit pass through the coefficient multipliers $141_0$–$142_{n-1}$ and are input to the counter 143 from which the sum is output.

In this embodiment, $m_0, m_1, m_2, m_3 \ldots m_{n-1}$ in FIG. 6 represent temporary memory locations for the data. It should be understood that there is a delay of sample time T for each delay component block. In this invention, the coefficients $K_0, K_1, \ldots K_{n-1}$ are assigned by a distribution such as that shown in FIG. 4a.

The details of the weighting computation can be explained in reference to the block diagram in FIG. 6 and the table in FIG. 7. When the first input X(0) is input to $m_0$, X(0) is multiplied by the coefficient $K_0$ of the coefficient multiplier $142_0$, and [X(0)·$K_0$] is output from the counter 143.

At the second sample time, the data X(0) is shifted from $m_0$ to $m_1$, and the data X(T) is input to $m_0$. At that time, the data X(0) is multiplied by the coefficient $K_1$ of the multiplier $142_1$ and the data X(T) is multiplied by the coefficient $K_0$, the sum is added by the counter 143, and [X(0)·$K_1$+X(T)·$K_0$] is output.

At the third sample time, the data X(0) is shifted from $m_1$ to $m_2$, the data X(T) is shifted from $m_0$ to $m_1$, and the data X(2T) is input to $m_0$. At that time, the data X(0) is multiplied by the coefficient $K_2$ of the multiplier $142_2$, the data X(T) is multiplied by the coefficient $K_1$, the data X(2T) is multiplied by the coefficient $K_0$. These are all added by the counter 143, and ]X$_{(0)}$·$K_2$+X$_{(T)}$·$K_1$+X$_{(2T)}$·$K_0$] is output.

A summary of the weighting processing procedure and the output results which occur when a signal having a waveform such as that shown in FIG. 3 is shown in FIG. 7. Note that, in FIG. 7, the memory locations (addresses) and the outputs which occur at each time are listed horizontally and the times are listed vertically. The shifts of the data which occur at each time are executed by the input of a timing signal from the timing control circuit 16 shown in FIG. 1. This is carried out in synchronization with the sample-and-hold circuits 11A and 11B and the A/D converters 12A and 12B.

Thus, if the data in the memory addresses $m_0, m_1, m_2, \ldots m_{n-2}, m_{n-1}$ is expressed as, respectively, $Dx_0, Dx_1, Dx_2 \ldots Dx_{n-2}, Dx_{n-1}$, the output $X_3$ of the weighting circuit can be found by the following Equation (2)'.

$$K_0Dx_0 + K_1Dx_1 + K_2Dx_2 + \ldots + K_{n-2}Dx_{n-2} + K_{n-1}Dx_{n-1} = X_3 \qquad (2)$$

Similarly, the output $Y_3$ can be found by the following Equation (2)':

$$K_0Dy_0 + K_1Dy_1 + K_2Dy_2 + \ldots + K_{n-2}Dy_{n-2} + K_{n-1}Dy_{n-1} = Y_3 \qquad (2)'$$

With a weighting coefficient having a waveform such as that shown in FIG. 4c, the absolute values of the weighting circuit are all identical values and the polarities are simply positive and negative. It is possible to obtain the output value by using a non-recursive type weighting circuit such as that shown in FIG. 10a. A non-recursive type weighting circuit corresponds to a feed-forward circuit. This circuit performs a simple weighting process. The process includes subtracting and adding the various values which flow in through the input side through each of the delay components and out of the output side of the final delay component. This sum is then multiplied once by the coefficient K. This transfer function can be expressed by the following Equation (1)':

$$H_z = K(-1 - Z^{-1} - Z^{-2} \ldots - Z^{-(n/2-1)} + Z^{-n/2} + Z^{-(n/2+1)} + Z^{-(n/2+2)} + \ldots + Z^{-(n-1)}) \quad (1)'$$

Where n is an even number.

Figure 10A:
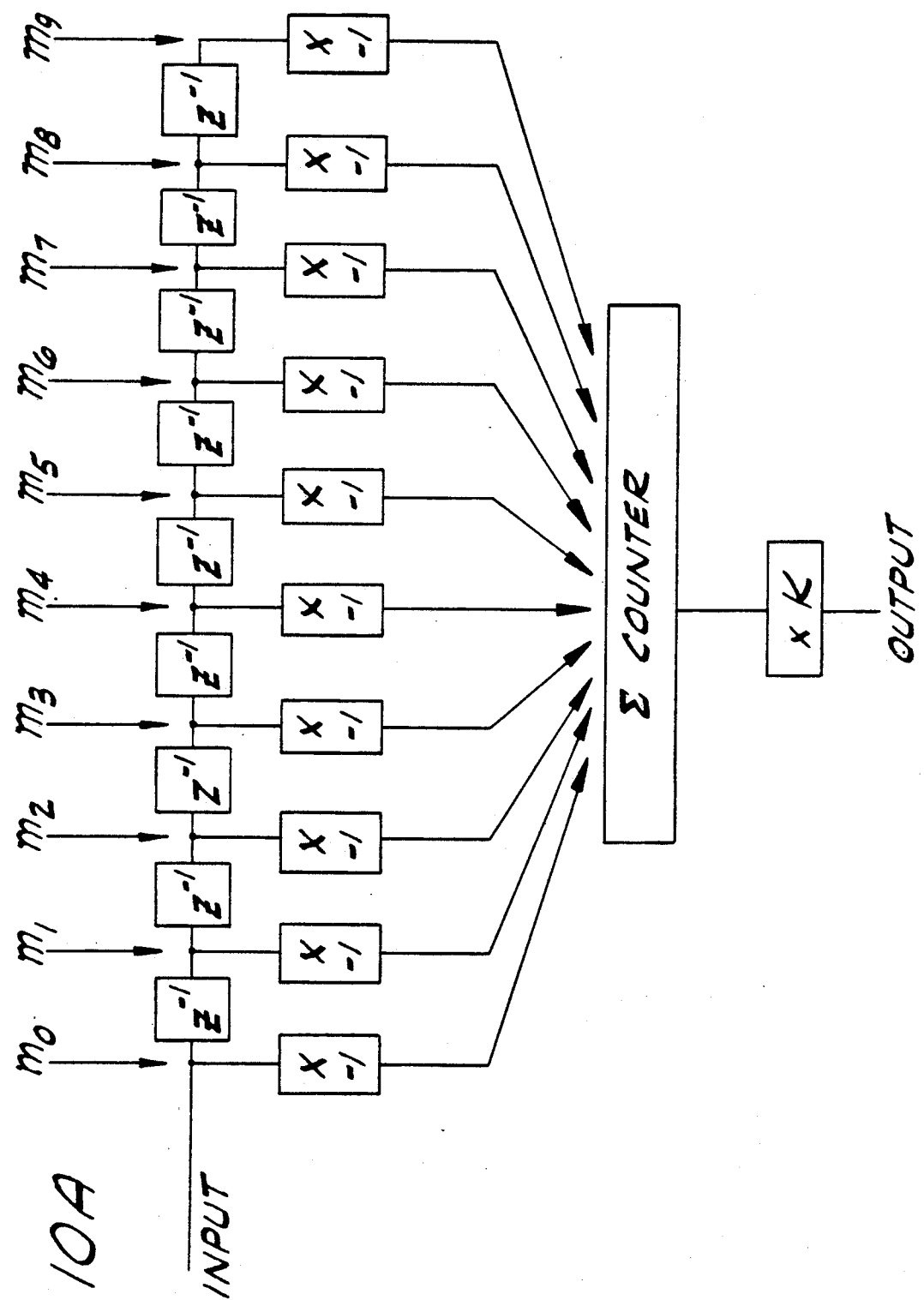
FIGS. 10a and 10b are block diagrams of other forms of the weighting circuit for the detector.

FIG. 10a is an example where n=10, and, if the data in the memory addresses $m_0, m_1, m_2, m_3, \ldots m_n$ is expressed as, respectively, $Dx_0, Dx_1, Dx_2, Dx_3, \ldots Dx_9$, the output $X_3$ of the weighting circuit can be expressed by the following Equation (3).

$$(-Dx_0 - Dx_1 - Dx_2 - Dx_3 - Dx_4 + Dx_5 + Dx_6 + Dx_7 + Dx_8 + Dx_9) \cdot K = X_3 \quad (3)$$

Where, $$K = 1/n = 1/10$$

Similarly, $Y_3$ can be expressed by the following Equation (3)':

$$(-Dy_0 - Dy_1 - Dy_2 - Dy_3 - Dy_4 + Dy_5 + Dy_6 + Dy_7 + Dy_8 + Dy_9) \cdot K = Y_3 \quad (3)'$$

Weighting computations such as this can be performed by a standard microprocessor when based on Equation (3) or (3)' for the embodiment shown in FIG. 10a. The computations based on Equation (2) or (2)' for the embodiment shown in FIG. 6 can be performed by using, for example, a 16-bit microprocessor or a commercially available multiplier/accumulator designed for digital computations. Because the program is easily understood by persons involved in this field, its explanation will be omitted here.

In place of the non-recursive type weighting circuit described above, it is also possible to use a weighting circuit composed of non-recursive type and a recursive type. A recursive type weighting circuit corresponds to a feedback circuit. In this case, Equation (1)' is modified to obtain the following Equation (1)":

$$\begin{aligned} H_2 &= K(-1 - Z^{-1} - Z^{-2} \ldots - Z^{(n/2-1)} + Z^{-n/2} + Z^{-(n/2+1)} + Z^{-(n/2+2)} \ldots + Z^{-(n-1)}) \\ &= -K\left(\frac{1-Z^{-l}}{1-Z^{-1}} - Z^{-l} \cdot \frac{1-Z^{-l}}{1-Z^{-1}}\right) \\ &= -K\left(1 - Z^{-1} \cdot \frac{1-Z^{-l}}{1-Z^{-1}}\right) \end{aligned} \quad (1)''$$

Provided that n=2l.

Figure 10B:
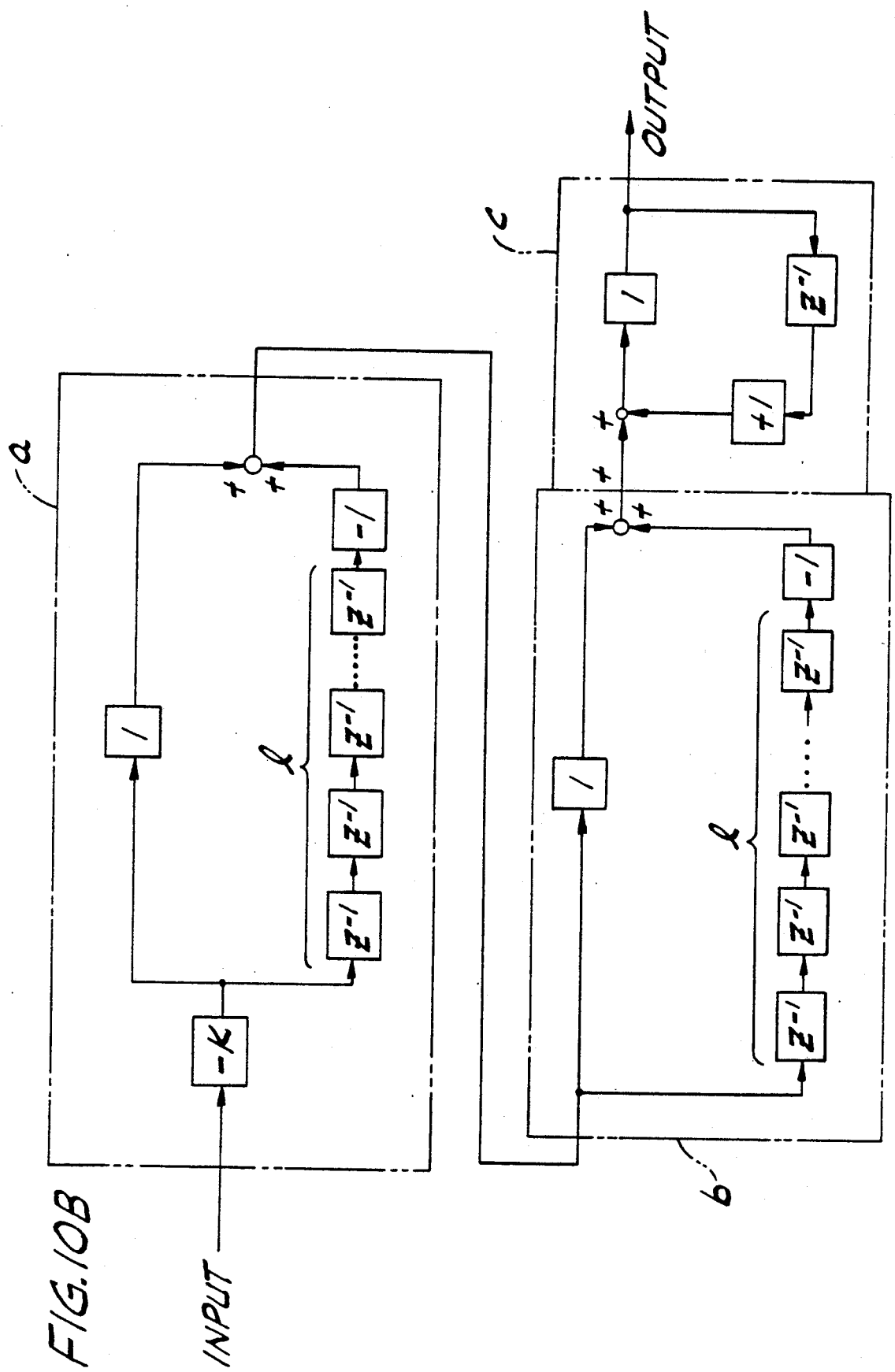

The above equation (1)" can be executed by the circuit shown in FIG. 10b, which includes non-recursive type circuits a and b, and a recursive type circuit c. When l=5, the result obtained by the circuit using Equation (1)" is the same as that obtained by the circuit shown in FIG. 10a. Thus, it is possible for a circuit including both a recursive type circuit and a non-recursive type circuit to perform the same function as a non-recursive type circuit. It is also possible to realize a circuit having a transfer function equivalent to Equation (1)' by embodiments other than those shown in FIGS. 10a and 10b.

Figure 2B:
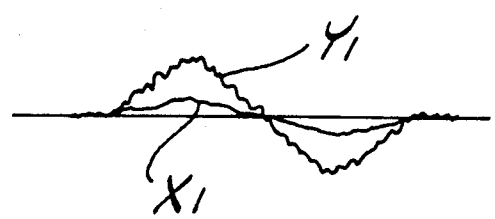

The above explanation uses iron as the detected matter (foreign matter) and is based on FIGS. 2a through 2c. The following explanation is based on FIG. 8 and concerns detection signals for various other materials detected as foreign matter. The phase angle of the detection signal for iron is generally delayed approximately 90° from that of the oscillation signal and the output sensitivity is high. In contrast, the phase difference of the detection signal for stainless steel with respect to the oscillation signal is not very large.

Now, using iron, for example, the component of the detection signal which is in-phase with the oscillation signal is indicated as X and the component which has a phase delay of 90° from the oscillation signal is indicated as Y. If both components are considered to be positive values, as shown in FIGS. 2b and 2c, the Y component of the detection signal for iron is larger than the X component. For some types of stainless steel (indicated as "$SUS_1$" in FIG. 8), the X component and the Y component are both positive values. For other types of stainless steel (indicated as $SUS_2$ in FIG. 8), the X component is a positive value and the Y component is a negative value. Among the various types of materials for detected matter, some generate lagging signals like that of iron, and others generate leading signals.

As described above, if a product containing foreign matter such as iron is passed through the detector, detection signals such as shown in FIGS. 2b and 2c will appear. Each of these signals has a waveform with two polarities, positive and negative (or negative and positive), for a single inspected object. If two objects are passed through one after another in close proximity, the detection signal $Y_2$, for example, will have four peaks such as $P_1', P_2', P_3',$ and $P_4'$ shown in FIG. 9a. In this case, $P_1', P_2', P_3'$ and $P_4'$ should be identified as separate pairs for each of the two objects being inspected. Unless a special identification circuit is separately provided for this $Y_2$ signal, it will not be possible to identify the separate signal groupings. Thus, $P_2'$ and $P_3'$ may be identified as one pair. If this occurs due to the polarities being in reverse phase, an incorrect identification may occur. A completely different material may be identified by means of the computed data on the discriminant equation and the R/ϕ indicator 20. The R/ϕ indicator 20 will be described later.

A $Y_3$ signal (the same is also true for the X signal) such as that shown in FIG. 9b will be correctly identified as a result of the weighting computation performed by the weighting circuit. The peak or maximum value $P_1''$, shown in FIG. 9b, corresponds to the pair of $P_1'$ and $P_2'$ in FIG. 9a and the peak $P_3''$ corresponds to the pair $P_3'$ and $P_4'$ in FIG. 9a. Thus, even if there is a continuous flow of products through the detector, it is possible for the signals to always be identified in a configuration corresponding to the products.

If the method used by weighting circuits 14A and 14B to assign the coefficients with respect to the coefficient multipliers $142_0$ to $142_{n-1}$ is characterized in that it is an odd-function distribution such as that shown in FIGS. 4a, 4b, or 4c, then the central coefficient multiplier corresponds to the origin point of that odd function and it has a point-symmetrical distribution with respect to that origin point. The signal transmission characteristics of the weighting circuits are similar to the characteristics of a band-pass filter with a pass band in or near the frequency range containing the frequency of a wave signal generated when a typical material such as iron is passing through the coils. The weighting circuits are effective in reducing any effects from unwanted noise. The DC component contained in the input signal is completely removed by the weighting multiplication.

The differential signal $C_{xy}$ of the secondary coils 4 and 5 may contain certain-amplitude residual AC signals as a result of the unbalance of the difference between the coil signals or for some other reason. In this case, these residual signals will cause DC components to appear in the $X_2$ and $Y_2$ output signals which have passed through the multiplication/detectors 7A and 7B and the smoothers/filters 9A and 9B. Although the A/D-converted signals still contain DC components, these signals are input to the weighting circuits 14A and 14B where the weighting eliminates the DC components. The residual AC signals do not affect the $X_3$ and $Y_3$ output signals of the weighting circuits 14A and 14B. Although existing detectors include a circuit which functions to remove the residual signal, such as the balance circuit 5 shown in FIG. 5 of the previously referred to Japanese patent Provisional Publication Sho. 57-198880, in the method described here, this type of supplementary circuit is unnecessary.

Recognition of the primary value by the central processing unit

The "primary value" is the representative value for the electromagnetic characteristics of an object being inspected. The central processing unit (CPU) 15B has a program, as shown by the flowchart of FIG. 11b, for the recognition of the primary values of the $X_3$ and $Y_3$ signals output from the weighting circuits 14A and 14B.

FIG. 11a is a representation of a detected and weighted $X_3$ signal across a specified time span.

In order to recognize the primary value, it is necessary to monitor the representative changes according to the time of the $X_3$ signal with a waveform such as that shown in FIG. 5. The monitoring span should be three to five times the time interval $t_1$ of the two peaks which occur when foreign matter generates a detection signal such as that shown in FIG. 3 is passed through the coils. An appropriate $2n+1$ number of $X_3$ (or $Y_3$) data signals obtained during that time span are constantly monitored.

For example, as shown in the following Table 1, the $X_3$ signals are monitored in order from the newest data to the oldest data and stored in a series of memory addresses.

TABLE 1

| Address | 0 | 1 | 2 | 3 | ... n | ... 2n |
|---|---|---|---|---|---|---|
| Data | $X_i$ | $X_{i-1}$ | $X_{i-2}$ | $X_{i-3}$ | ... $X_{i-n}$ | ... $X_{i-2n}$ |

The central data address in this case is n and the data $X_{i-n}$ is stored at that address at that time. When new data is input, the previous data shift in order from the left to the right. The new data is then input to address 0 and the oldest data is discarded. Also, the data at the central address n is monitored and when the absolute value of that data is the only maximum value among the $2n+1$ number of data items at that time, that data $X_{i-n}$ is recognized as the primary value.

When the data $X_{i-n}$ indicating the maximum value is at a position such as that indicated by the circle A in FIG. 11a and a comparison indicates that there is an identical value $X_{i-n+\alpha}$ in the circle A, the following equation is used to check whether or not the identical value is in the specific vicinity of the central address.

$$0<|\alpha|\leq\delta,\ X_{i-n+\alpha}=X_{i-n}?$$

Provided that $\delta$ is a value which determines the limit of the vicinity of the central address.

Then, if it is determined that the identical value is in the vicinity of the central address, the Y signal values $Y_{i-n}$ and $Y_{i-n+\alpha}$ which correspond to positions of the $X_{i-n}$ and $X_{i-n+\alpha}$ data are compared, and if $Y_{i-n} \geq Y_{i-n+\alpha}$, $X_{i-n}$ is determined to be the primary value $X_m$.

Also, the corresponding $Y_{i-n}$ value is determined to be the primary value for the Y signal. Conversely, if the $Y_{i-n+\alpha}$ value is found to be larger than the $Y_{i-n}$ value, $X_{i-n}$ is not determined to be the primary value. If this occurs, because the $Y_{i-n+\alpha}$ data is subsequently shifted to the central address $\alpha$ times the sampling interval later, that value becomes the maximum value and is thus determined to be the primary value $Y_m$.

Each time new data is added at the specified time intervals, each of the positions (addresses) are shifted one place and the oldest data $Y_{i-2n}$ is discarded.

The primary value $X_m$ has the following characteristics.

First, even when a signal containing a 2N number of peaks is input into the weighting circuit 14A or 14B as a result of an N number of objects being passed one after another through the coils, it is converted into a primary value signal containing N number of peaks. The object is easily identified and recognized by using the primary value recognition program described above and there is no danger of an error signal occurring.

Second, if the $X_2$ or $Y_2$ signal is a reverse-phase signal from the waveform shown in FIG. 2c, the $X_3$ or $Y_3$ output signal of the weighting circuit is a reverse-polarity signal from that shown in FIG. 5.

Thus, the primary values $X_m$ and $Y_m$ obtained from the $X_3$ and $Y_3$ signals by using the primary value recognition program (shown in FIG. 11b) are a pair of useful and precise signal data. The data contains positive or negative polarities, numerical data, and the characteristics of any type of materials composing foreign matter. Foreign matter which are electrically conductive or dielectric or have high-frequency loss can be identified and processed in two dimensions in one of the four quadrants of the X-Y coordinate system. Also, these primary value signals contain all of the electrical data resulting from and related to the presence of foreign matter even for products (inspected objects) which contain extremely minute amounts of iron, stainless steel, brass, or other foreign matter. The primary value signals also contain all of the data of both signals representing the product characteristics and signals resulting from the foreign matter, even in instances when the product itself contains conductive materials, such as products containing large amounts of water or salt, or when the wrapping materials are conductive.

Thus, even in any of the instances just described, this method, together with the identification processing of the detailed identification section to be explained later permits precise identification of foreign matter which was difficult to identify (detect) using previously available methods.

IDENTIFICATION BY THE CPU (JUDGMENT SECTION)

The central processing unit 15 includes a program for identification. The following is an explanation of one preferred embodiment for the identification formed by the program.

In the following explanation, the effects of product characteristics on the detector when measuring a material which has marked product characteristics are referred to as the material effect.

Products can be generally classified into those which have product characteristics corresponding to the detector and those which do not. The material effect generally has characteristics peculiar to each individual product and a phase angle peculiar to each product. Although the size of the vector will change with the content volume of the product, the phase angle will usually not change very much.

Figure 12:
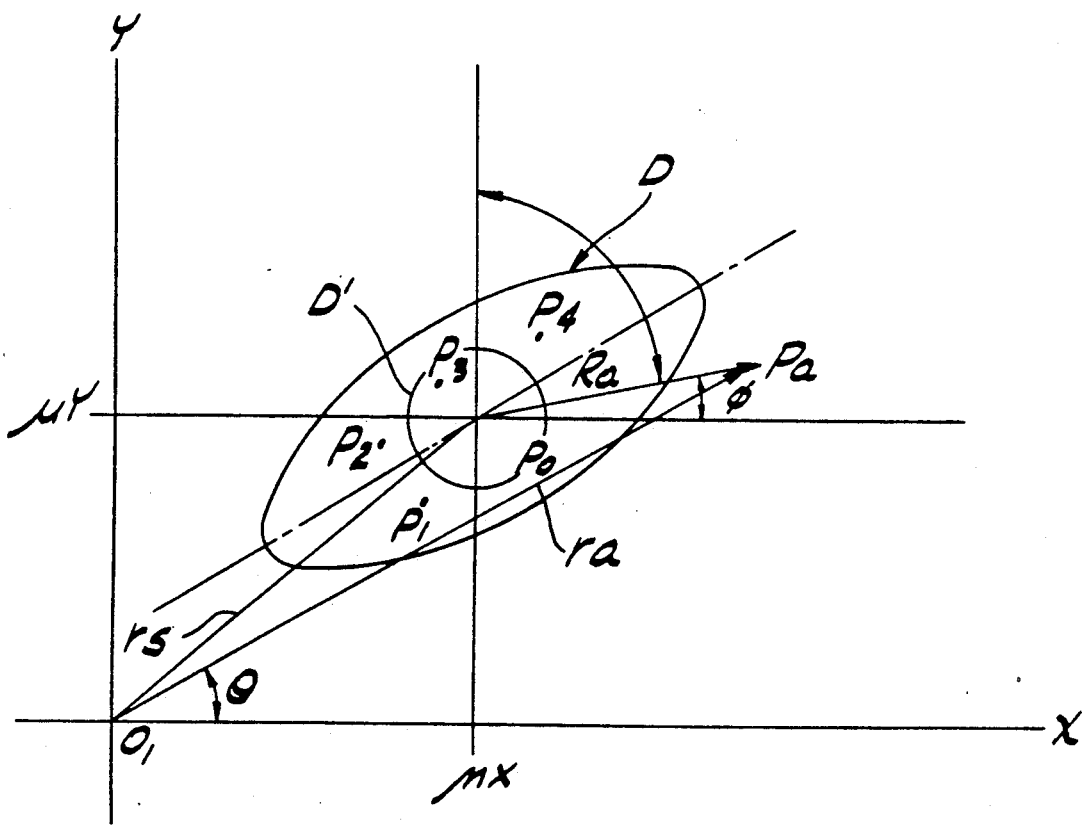
FIG. 12 shows a graph representing sample test data for objects having material effect.

FIG. 12 shows a two-axis four-quadrant plane on which the points $P_1(X_{m1}, Y_{m1})$, $P_2(X_{m2}, Y_{m2})$, etc., can represent the primary values $X_m$ and $Y_m$ for various volumes of products of the same type which have material effect, but which contain no foreign matter. Even if products of the same type differ somewhat in volume or weight, these points will be included in an elliptic region D, and will tend to be distributed near the central average point $P_o(\mu X, \mu Y)$, which can be represented by a vector $r_s$ from the origin point $O_1$ of the graph.

The primary values for packages of products of the same type and substantially of the same volume and weight with material effect, but with no foreign matter, will be represented as points within a small circular region D'. The center of D' is at the average point such as $P_o$ in FIG. 12 due to the vectors being substantially constant in size and angle.

The primary values for a product having material effect and containing even minute particles of metal or other foreign matter will be represented at a point $P_a$ ($X_a$, $Y_a$) as a vector $r_a$ on the graph in FIG. 12. Subtraction of vector $r_s$ from vector $r_a$ gives a deviation vector $R_a$ from the average point $P_o$.

Thus, the region D defines the distribution boundary for products without foreign matter and data outside this region, such as vector $R_a$, are judged to represent products which contain foreign matter.

For products having neither material effect nor foreign matter almost no waveform characteristics as shown in FIG. 5 appear for the weighted signals. In this case, random noise resulting from internal electrical factors, such as the operation of the amplifier, the signal detector, or a conveyor, becomes the primary factor in determining the distribution region D.

As shown in FIG. 13, these products are represented as points $P_1$, $P_2$, etc., within a circular region D on the graph. The central average point $P_o$ of region D is extremely close to the origin point. The region D is extremely smaller than for products having material effect.

In this case, the size of the deviation vector $R_a$ is approximately the same as that of the signal vector $r_a$. Because of the small size of region D, even if the absolute lengths or quantities of these vectors are relatively small, they will extend beyond region D. It is thus possible to detect even more minute particles of foreign matter than for products having material effect.

As mentioned earlier, the selector switch 18 is provided with a sample test mode. There is also a sample mode selector switch 23 which allows selection of either an "M" or "N" mode for the sample test, the characteristics of which are explained below.

M (material effect detection) mode sample test:

The test of a sample object which has material effect and which contains no foreign matter uses the primary values $X_m$ and $Y_m$ containing product characteristics. The signals obtained through this test are data which includes the product characteristics together with their occasional fluctuations, and also the effects of the various minute amounts of noise which remains even after filtering.

N (noise detection) mode sample test:

This test is done for sample objects which have no product characteristics and which contain no foreign matter. A passage detection means (not illustrated) using a photoelectric device or other method may be provided in order to detect when a packaged object passes through the coils so that the passage signal is generated for a period of time which corresponds to the time $2t_1$. Time $2t_1$ is the sum of time $t_1$ preceding the passage of the center of the coils by the inspection object and time $t_1$ following the passage of the center. While this passage signal is being generated, pairs of weighted values $X_3$ and $Y_3$ are extracted as data $X_n$ and $Y_n$, respectively, at regular intervals of a certain number of samples from among the continuous weighted values. For example, 10 to 20 weighted values are extracted for one packaged object. These values $X_n$ and $Y_n$ are referred to as "N mode sample signals". Generally, because various types of random noise are a major factor concerning the signals of products which do not generate product characteristics, the N mode sample signals are also random with regard to a time series. It is possible to appropriately extract the characteristics of the amplitude, distribution, etc., of the original random signals from the many data signals obtained by extracting at certain intervals as described above.

The selector switch 18 is also provided with an operation mode for actual operation of the device. During operation in this mode, data is processed by using the primary value signals.

A sample test is performed by selecting either the M or N mode. In order to accomplish this, a memory is provided inside the CPU 15B for storing a number of sample data $X_m$ and $Y_m$ (M mode) or $X_n$ and $Y_n$ (N mode) obtained when the product sample passes through the coils. A program is provided to compute each of the following values using that sample data.

$\mu X$: average vlaue of $X_m$ or $X_n$ $\mu Y$: average value of $Y_m$ or $Y_n$ $\sigma_x$: standard deviation regarding $X_m$ or $X_n$ $\sigma_y$: standard deviation regarding $Y_m$ or $Y_n$ $\sigma_{xy}$: cavariance regarding $X_m$ or $Y_m$ or $X_n$ or $Y_n$ $\rho$: correlation coefficient expressed as $\dfrac{\sigma xy}{\sigma x \cdot \sigma y}$ Because the detailed explanations of the symbols listed above are contained in general reference works on statistics, they will be omitted here.

In the judgment processing, an equation such as the following Equation (4), which is one example of the statistical distribution functions found in reference works on statistics, is used as the density function of the statistical distribution of the data. This equation works both for inspection objects which have a material effect and for those which do not, as long as the data is considered to be from the same population.

$$f(x,y) = \frac{1}{2\pi\sqrt{1-\rho^2}\,\sigma_x\sigma_y} \cdot \quad (4)$$

$$e^{-\frac{1}{2(1-\rho^2)}\left[\frac{(X-\mu X)^2}{\sigma_x^2} - 2\rho\frac{(X-\mu X)(Y-\mu Y)}{\sigma_x\sigma_y} + \frac{(Y-\mu Y)^2}{\sigma_y^2}\right]}$$

In this method, an equation is provided which uses $\{[2/(1+\rho)].d^2\}$ for the right side and the exponent of the above Equation (4) for the left side. This gives the following Equation (5), which is the basic equation for obtaining a discriminant equation. The discriminant equation determines a reliable or allowable region within which the data for objects containing no foreign matter should appear.

$$\frac{1}{(1-\rho^2)} \cdot \frac{(X-\mu X)^2}{\sigma_x^2} - 2\rho \frac{(X-\mu X)(Y-\mu Y)}{(1-\rho^2)\sigma_x\sigma_y} + \quad (5)$$

$$\frac{1}{(1-\rho^2)} \cdot \frac{(Y-\mu Y)^2}{\sigma_y^2} = \frac{2}{1+\rho} d^2$$

The "d" on the right side of the above Equation (5) is called the region coefficient. The region coefficient setting device 24 shown in FIG. 1 is provided as the input device for this coefficient.

The value d is essentially a statistical numerical coefficient of $\sigma$. For example:

(i) For $2\sigma, d = 2$,                                   (6)

$$\therefore \frac{2}{1+\rho} \times d^2 = \frac{8}{1+\rho}$$

(ii) For $3\sigma, d = 3$,                                  (7)

$$\therefore \frac{2}{1+\rho} \times d^2 = \frac{18}{1+\rho}$$

Coefficient d can be selected by the operator in association with the confidence value.

By using the following definitions, $$A = \frac{1}{(2-\rho^2)\sigma_x^2}$$

$$B = \frac{-2\rho}{(1-\rho^2)\sigma_x \cdot \sigma_x}$$

$$C = \frac{1}{(1-\rho^2)\sigma_y^2}$$

Equations (5) can be rewritten as the following Equations (8) and (8)'

$$A(X-\mu X)^2 + B(X-\mu X)(Y-\mu Y) + C(Y-\mu Y)^2 = \quad (8)$$

$$\frac{2}{1+\rho} d^2$$

$$A(X-\mu X)^2 + B(X-\mu X)(Y-\mu Y) + C(Y-\mu Y)^2 - \quad (8)'$$

$$\frac{2}{1+\rho} d^2 \leq 0$$

Where X represents $X_m$ or $X_n$ and Y represents $Y_m$ or $Y_n$

Equation (8) identifies the boundary and Equation (8)' is the discriminant equation which judges whether or not the data is included within the region.

Equation (8)' is included in this device in the form of a program and is computed each time the data from a pair of X, Y input signals is input.

Theoretically, the discriminant equation (8)' can be determined by the operator selecting and inputting appropriate values A, B, C and the region coefficient d in accordance with the characteristics of the object being inspected (i.e., product). However, because it is not easy to determine appropriate values of A, B, and C, provision has been made in this embodiment in order to simplify the determination tasks of the operator.

In place of a means to input the values A, B, and C, this device is provided with a program whereby, when the operator uses the selector switch 18 to select the discriminant equation computation mode, the data which was obtained and stored in the sample test is recalled. The statistical quantities $\mu X$, $\mu Y$, $\sigma_x$, $\sigma_y$, $\rho$, etc., are automatically computed and the values A, B, and C are also automatically computed. In addition, because the value for the right side of Equation (8) can be computed by using these automatically computed results when the value d is input by the operator via the region coefficient setting device 24, the program requires only the input of the X, Y data in order to perform the calculation of the Equation (8)' which is stored in memory. In this way, the automatic computation of the discriminant Equation (8)' is completed.

OPERATION PROCEDURES

The composition and basic operation of this detector are as described above and the following is an explanation of the procedures involved in the detection of foreign matter. The various preparatory procedures described below are carried out prior to actual operation.

The operator sets the selector switch 18 to the sample test mode. At this time, the R/$\phi$ indicator 20 is set automatically to the mode indicating the absolute value r and phase angle $\theta$ of a vector r from the origin point 01 (not illustrated) on the x-y coordinate system (FIGS. 12 and 13). The r and $\theta$ values are calculated as follows and indicated on the R/$\phi$ indicator 20:

$$r = \sqrt{X_3^2 + Y_3^2}$$

$$\theta = \frac{180}{\pi} \cdot \tan^{-1}\frac{Y_3}{X_3}$$

First, a no-load test is performed to monitor the noise level of the apparatus without products passing through the coils by observing the values on the R/$\phi$ indicator 20. Next, for a product test operation, the operator selects a number of samples which have previously been determined to be free of foreign matter, passes them through the coils, reads the values on the indicator 20, and determines whether or not the values have increased from the values during no-load operation.

If data appears for which it is determined that the values indicated during the product test are clearly larger than the noise level during no-load operation, then it is judged that there are product characteristics, and the subsequent sample test is carried out in the "M"

mode. If not, the subsequent sample test is carried out in the "N" mode.

As a result of the test operation, the operator sets the sample mode selector switch 23 to either the "M" or "N" mode. The operator presses the execution button 21, selects an appropriate large number of objects to be inspected which have previously been determined to be free of foreign matter for use as samples, and then performs the procedure for the sample test. As a result, regardless of which mode was used, the data for this large number of samples is stored in the internal memory.

When the operator sets the selector switch 18 to the mode of computation of the discriminant equation and presses the execution button 21, using the large amount of data obtained in the sample test, the values $\mu X$, $\gamma$, $\sigma_x$, $\sigma_y$, $\rho$, etc., related to that data are computed as described earlier. Furthermore, the various equations for the A, B, and C values are calculated and the coefficients for the left side of Equation (8) are determined.

When the operator selects the appropriate region coefficient d and inputs it into the region coefficient setting device 24, the right side of Equation (8) which determines the boundary of the region is calculated and discriminant Equation (8)' is determined. This completes the computation of the discriminant equation.

Actual operation begins once the preparatory procedures have been completed. During actual operation, when the selector switch 18 is set to the operation mode, the program control circuit 17 directs the CPU 15B to run the program for inspection of objects. At the same time the R/φ indicator 20 is automatically set to the mode indicating the absolute value R and phase angle φ of the deviation vector R (not shown) from the average point $P_o$ on the x-y coordinate system (FIGS. 12 and 13).

The operator presses the execution button 21 for objects to begin passing through the coils. This causes a succession of weighted signals $X_3$ and $Y_3$ to be input to the CPU 15B, wherein pairs of primary values $X_m$ and $Y_m$ are obtained by the program of FIG. 11b. Even while this processing is being performed, the detection operation of the objects continues.

Figure 14:
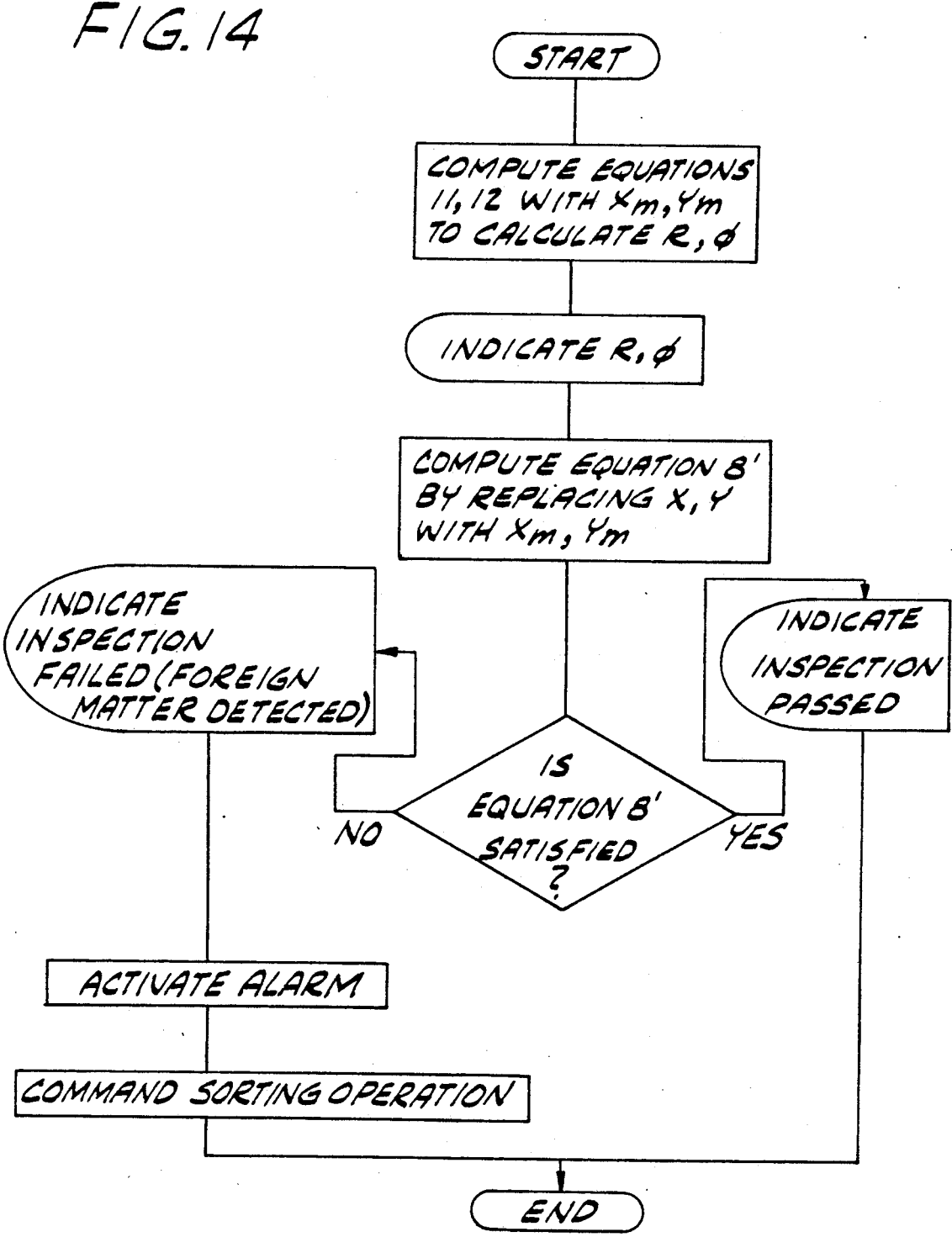
FIG. 14 is a flowchart of a program for determining and indicating whether primary values are outside a region predetermined with sample test data.

As shown in the flowchart in FIG. 14, the following Equations (11) and (12) are then computed using the primary value $X_m$ and $Y_m$ and the resultant values R and φ are indicated by the indicator 20.

$$R = \sqrt{(X - \mu X)^2 + (Y - \mu Y)^2} \quad (11)$$

$$\phi = \frac{180}{\mu} \cdot \tan^{-1} \frac{(Y - \mu y)^2}{(X - \mu X)^2} \quad (12)$$

The values A, B, C, and $\{2/(1+\rho)\}$ in Equation (8)' have been determined in the preparatory procedures. When the primary values $X_m$ and $Y_m$ for a particular object are substituted for X and Y in Equation (8)', if they satisfy the equation, the data is judged to be within the reliable region determined with the samples.

If the equation is not satisfied, the alarm 19 is activated to warn that the object has not passed the inspection and a sorting device (not shown) at the end of the line is commanded to remove the object.

When an object contains material such as water or salt which has a material effect that varies from the previously sampled material effect, the computation of the discriminant equation may not be satisfied. This will cause a signal indicating that the object is faulty to be generated. Thus, this method is also effective for use in quality control.

Because the sample test data is automatically computed to determine the judgment conditions, the determination of the judgment conditions is almost completely automatic. The operator only has to consider such things as whether to select a confidence level of $2\sigma$ or $3\sigma$ in order to determine the region coefficient. There is no need for adjustments which require skilled expertise, such as the phase adjustments of the excitation signal or of the reference signal for signal detection as are required in prior art detectors. Also, it is possible to achieve a remarkable improvement over the prior art detectors in the precision of the detection of foreign matter which is contained in inspected objects having a material effect.

As described above, because it is possible to clearly identify each detection signal even when the detector continuously generates detection signals, for example, when it is used as a detector for powders or other objects which flow continuously, it is possible to accurately find the number of particles of foreign matter which are present. Additionally, if the transport speed and detection speed are known, it is also possible to accurately find the location of the foreign matter.

For this reason, damage to processing equipment which might result from the presence of foreign matter in raw materials, or the like, is prevented. Furthermore, the shipment of products containing foreign matter is also prevented.

It is also possible to detect instances where the quality of the product differs from a specified level. Furthermore, because the detection signals contain not only data on whether or not foreign matter is present, but also quantitative data as well, the detection of foreign matter or of quality differences is easily accomplished.

Furthermore, because the composition is simple, the detector can be provided at a lower cost than previous detectors, and maintenance and adjustments can be easily performed.

As various changes could be made in the above constructions without departing from the scope of the invention, it is intended that all matter contained in the above description or shown in the accompanying drawings shall be interpreted as illustrative and not in a limiting sense.

What is claimed is:

1. A detector for detecting an object containing foreign matter, said detector comprising:
    means for providing a detected signal which represents electromagnetic parameters of the object and any foreign matter therein, said signal having two peaks of opposite polarity;
    means connected to said providing means for converting said signal into a series of digital values;
    means connected to said converting means for weighting the digital values by converting them into a series of digital values having a maximum value;
    means connected to said weighting means for determining whether the maximum value is within a predetermined range; and
    means for indicating the presence of foreign matter in the object when the maximum value is not within the predetermined range.

2. The detector of claim 1 wherein said providing means comprises:

means for generating an oscillating signal;
means connected to said generating means and including a primary coil and two secondary coils for generating an electromagnetic field for producing a differential signal when an object passes through said electromagnetic field; and
means for detecting the differential signal.

3. The detector of claim 1 wherein the weighting means includes non-recursive weighting means.

4. The detector of claim 1 wherein the weighting means further includes recursive and non-recursive weighting means.

5. A detector for detecting an object containing foreign matter, said detector comprising:
an oscillator for generating an oscillating signal;
a phase shifter connected to said oscillator and adapted to provide a phase shifted oscillating signal;
an electromagnetic transducer including an excitation coil connected to said oscillator and two interconnected detection coils magnetically coupled to said excitation coil and adapted to produce a differential signal therebetween when an object is passed through said transducer;
a first detector adapted to produce a first detected analog signal corresponding to the component of the differential signal in phase with said oscillating signal, said first detected analog signal having two peaks of opposite polarity;
a second detector adapted to produce a second detected analog signal corresponding to the component of the differential signal in phase with the phase shifted oscillating signal, said second detected analog signal having two peaks of opposite polarity;
means connected to said first and second detectors for converting the first and second analog detected signals into first and second series of digital values; respectively;
means connected to said converting means for weighting the digital values by converting each of the series into a series of values having a maximum value; and
means for indicating the presence of foreign matter in the object when at least one of the maximum values is outside a predetermined range.

6. The detector of claim 5 wherein the weighting means includes non-recursive weighting means.

7. The detector of claim 5 wherein the weighting means further includes recursive and non-recursive weighting means.

8. A detector for detecting an object containing foreign matter, said detector comprising:
an oscillator for generating an oscillating signal;
an electromagnetic transducer including an excitation coil connected to said oscillator and two interconnected detection coils magnetically coupled to said excitation coil and adapted to produce a differential signal therebetween when an object is passed through said transducer;
detector means connected to said detection coils for producing a detected analog signal having two peaks of opposite polarity;
conversion means connected to said detector means for converting the analog signal into a series of digital values;
weighting means connected to said conversion means to convert the digital values into a series of values having a maximum value; and
indicating means for indicating the presence of foreign matter in the object when the maximum value is outside a predetermined range.

9. The detector of claim 8 wherein the weighting means includes non-recursive weighting means.

10. The detector of claim 8 wherein the weighting means further includes recursive and non-recursive means.

11. A method for detecting an object containing foreign matter, said method comprising the steps of:
providing a detected signal which represents electromagnetic parameters of the object and any foreign matter therein, said signal having two peaks of opposite polarity;
converting the detected signal into a series of digital values;
weighting the digital values by converting them into a series of values having a maximum value;
determining whether said maximum value is within a predetermined range; and
indicating the presence of foreign matter in the object when the maximum value is outside the predetermined range.

12. A method for detecting an object containing foreign matter, said method comprising the steps of:
generating an oscillating signal;
phase shifting the oscillating signal;
producing a differential signal by passing an object through an electromagnetic transducer including an excitation coil connected to said oscillating signal and two interconnected detection coils magnetically coupled to said excitation coil;
detecting a first analog signal corresponding to the component of the differential signal in phase with said oscillating signal, said first detected analog signal having two peaks of opposite polarity;
detecting a second analog corresponding to the component of the differential signal in phase with the phase shifted oscillating signal, said second detected analog signal having two peaks of opposite polarity;
converting the first and second analog signals into first and second series of digital values, respectively;
weighting the digital values by converting each of the series into a series of digital values having a maximum values; and
indicating the presence of foreign matter in the object when at least one of the maximum values is outside a predetermined range.

13. A detector for detecting foreign matter in an object comprising:
means for providing a detected signal representative of an electromagnetic parameter of the object;
means connected to said providing means for converting said detected signal into a series of digital values;
means connected to said converting means for weighting said digital values; and
means connected to said weighting means for determining a representative value for the object from said weighted digital values and for comparing said representative value to a reference value wherein the weighting means comprises means for successively multiplying each of the digital values by a series of coefficients and means for summing each of the digital values multiplied by the series of coefficients after each successive multiplication to provide a series of weighted digital values.

14. The detector of claim 13 wherein the series of coefficients include values of opposite polarity.

15. The detector of claim 14 wherein said weighting means includes both recursive and non-recursive weighting means.

16. A detector for detecting foreign matter in an object comprising:
  means for providing a detected signal representative of an electromagnetic parameter of the object;
  means connected to said providing means for converting said detected signal into a series of digital values;
  means connected to said converting means for weighting said digital values; and
  means connected to said weighting means for determining a representative value for the object from said weighted digital values and for comparing said representative value to a reference value wherein the determining means comprises means for continuously monitoring a predetermined number of the weighted digital values as a series and determining a maximum value from said number of the weighted values as said representative value for the object being inspected.

17. A detector for detecting foreign matter in an object comprising:
  an oscillator for generating an oscillating signal;
  a phase shifter connected to said oscillator and adapted to provide a phase shifted oscillating signal;
  an electromagnetic transducer including an excitation coil connected to said oscillator and two interconnected detection coils magnetically coupled to the excitation coil and adapted to produce a differential signal therebetween when the object is passed through said transducer;
  a first detector adapted to produce a first detected analog signal corresponding to the component of the differential signal in phase with said oscillating signal;
  a second detector adapted to produce a second detected analog signal corresponding to the component of the differential signal in phase with said phase shifted oscillating signal;
  means connected to said first and second detectors adapted for converting the first and second analog detected signals into first and second series of digital values, respectively;
  means connected to said conversion means for weighting the digital values; and
  means connected to said weighting means for selecting a representative value for the object from each of the first and second series of the weighted digital values wherein said weighting means comprises:
  means including a transfer function for successively multiplying each of the digital values by a series of coefficients and for summing each of the digital values multiplied by the series of coefficients and wherein said series of coefficients are discretely distributed in the form of an odd function with respect to an origin point which is the term with an order which is substantially one-half of the highest order.

18. The detector of claim 17 wherein said odd function has a waveform which is substantially the same as a typical analog signal detected by the passing of an electromagnetically conductive object through said transducer.

19. The detector of claim 17 wherein said weighting means includes recursive and non-recursive weighting means.

20. A detector for detecting foreign matter in an object comprising:
  an oscillator for generating an oscillating signal;
  an electromagnetic transducer including an excitation coil connected to said oscillator and two interconnected detection coils magnetically coupled to the excitation coil and adapted to produce a differential signal therebetween when an object is passed through said transducer;
  detector means connected to said detection coils for producing a detected analog signal;
  conversion means connected to said detector means for converting the detected analog signal into a series of digital values;
  weighting means connected to said conversion means to weight the digital values; and
  selecting means connected to said weighting means for selecting a representative value for the object from the weighted digital values wherein said weighting means comprises:
  means including a transfer function for successively multiplying each of the digital values by a series of coefficients and for summing each of the digital values multiplied by the series of coefficients and wherein said series of coefficients are distributed in the form of an odd function with respect to an origin point which is the term with an order which is substantially one-half of the highest order.

21. The detector of claim 20 wherein said odd function has a waveform which is substantially the same as a typical analog signal detected by the passing of an electromagnetically conductive object through said transducer.

22. A detector for detecting foreign matter in an object comprising:
  an oscillator for generating an oscillating signal;
  a phase shifter connected to said oscillator and adapted to provide a phase shifted oscillating signal;
  an electromagnetic transducer including an excitation coil connected to said oscillator and two interconnected detection coils magnetically coupled to said excitation coil and adapted to produce a differential signal therebetween when an object is passed through said transducer;
  a first detector adapted to produce a first detected analog signal corresponding to the component of the differential signal in phase with said oscillating signal;
  a second detector adapted to produce a second detected analog signal corresponding to the component of the differential signal in phase with the phase shifted oscillating signal;
  means connected to said first and second detectors for converting the first and second analog detected signals into first and second series of digital values, respectively;
  means connected to said converting means for weighting the first and second series of digital values;

means connected to said weighting means for determining two representative values for the object by continuously monitoring a predetermined number of each series of the weighted values and selecting a maximum value from said predetermined number of each series of weighted values; and means for indicating the presence of foreign matter when at least one of the representative values is not within a preset range.

* * * * *